H. R. COX & W. SCHMIDT.
SAFETY GAS VALVE.
APPLICATION FILED AUG. 31, 1911.

1,037,208.

Patented Sept. 3, 1912.

WITNESSES
J. H. Reichenbach.
Walton Harrison.

INVENTORS.
Howard R. Cox.
William Schmidt
BY
ATTORNEYS

UNITED STATES PATENT OFFICE.

HOWARD RAYMOND COX AND WILLIAM SCHMIDT, OF NEW YORK, N. Y.

SAFETY GAS-VALVE.

1,037,208.

Specification of Letters Patent.     Patented Sept. 3, 1912.

Application filed August 31, 1911. Serial No. 646,984.

*To all whom it may concern:*

Be it known that we, HOWARD RAYMOND COX and WILLIAM SCHMIDT, citizens of the United States, and residents of the city of New York, borough of Brooklyn, in the county of Kings and State of New York, have invented a new and Improved Safety Gas-Valve, of which the following is a full, clear, and exact description.

Our invention relates to safety gas valves of the kind which close automatically in case of fire.

More particularly stated, our invention comprehends a self-closing valve containing a valve seat and a valve member movable against said seat, together with means for exerting leverage upon said valve member as the same is pressed against its seat.

Our invention further comprehends a fusible member used in connection with a valve of this kind and provided with means for preventing the escape of gas otherwise liable to take place owing to the destruction of said fusible member.

Our invention further comprehends various improved devices for increasing the general efficiency of the valve independently of the particular use to which it is applied.

Reference is to be had to the accompanying drawing forming a part of this specification, in which like characters of reference indicate corresponding parts in all the views, and in which—

Figure 1:
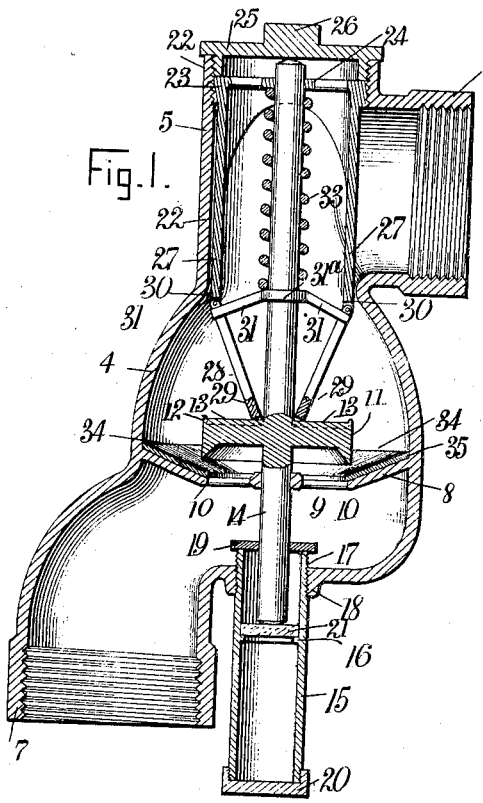
Figure 2:
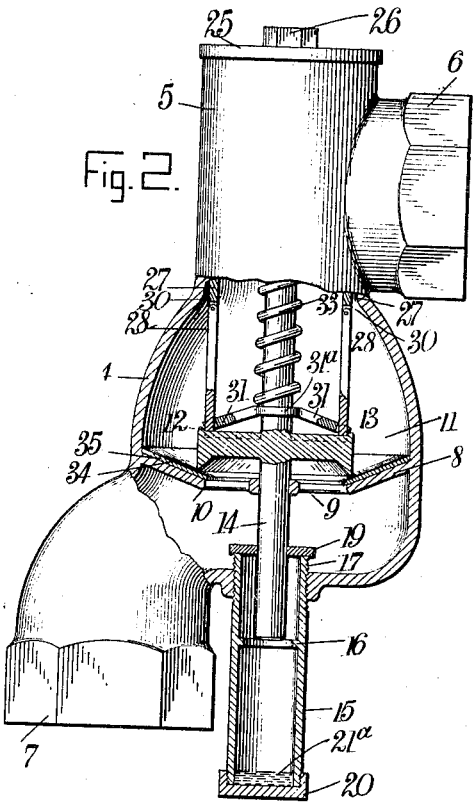
Figure 3:
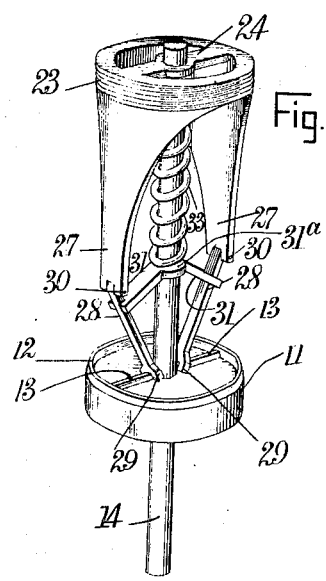

Figure 1 is a substantially central section through our improved safety gas valve, the parts being in their respective normal positions; Fig. 2 is a view partly in section and partly in elevation, showing the movable parts as they appear immediately after the fusible member has been destroyed by heat; and Fig. 3 is a detail showing in perspective the lever mechanism for forcing the movable valve member against the valve seat.

A valve casing is shown at 4 and is provided with a cylindrical portion 5, and also with an inlet 6 and with an outlet 7. Disposed within the casing 4 and integral with the same is a web 8 having substantially an annular form, this web constituting a valve seat. Integral with the web 8 and disposed centrally of the same is a spider 9. Between the spider 9 and the web 8 are open spaces 10 through which the gas normally flows.

A valve member 11 having generally the form of a disk is provided, upon its upper surface, with an annular bead 12 integral with it, and is further provided with a pair of rails 13 in alinement with each other and disposed upon opposite sides of a valve stem 14 upon which the valve 11 is mounted. The rails 13, bead 12 and disk-like valve 11, with the stem 14, may conveniently be cast in one piece, if desired. The rails 13 are simply a pair of rod-like members extending in opposite directions from the stem 14 and merging into the bead 12.

A barrel 15 made of metal, and having generally the form of a cylinder, is provided internally with an annular partition 16 and is also provided externally with a threaded portion 17. This threaded portion extends through an annular bearing 18 carried by the casing 4 so that the barrel 15 extends slightly into the casing. A washer 19 encircles the valve stem 14 and rests upon the upper end of the barrel 15. The lower end of this barrel is normally closed by a cap 20. A disk 21 of fusible metal, or equivalent material, adapted to be destroyed by heat, rests upon the annular partition 16, and the valve stem 14 normally rests upon the disk 21.

The upper end of the cylindrical portion 5 is provided with a portion 22 threaded internally. Fitting into this portion is an annular supporting member 23 which is threaded externally to fit it. This supporting member 23 carries a spider 24 integral with it. A cap 25 is provided centrally with an annular portion 26 to be engaged by a wrench for the purpose of turning the cap. This cap is fitted into the threaded portion 22, as will be understood from Fig. 1. The annular supporting member 23 is provided with a pair of downwardly projecting arms 27 and these are engaged by a pair of movable levers 28. These levers are inclined toward each other and from their bottom ends are suspended two forks 29. The levers 28 are, by aid of pins 30, journaled in the lower ends of the arms 27 which are normally stationary. A pair of arms 31 are mounted integrally upon a collar 31ª, the latter being slidably mounted upon the stem 14. A compression spring 33 encircles the upper portion of the valve stem 14 and engages the spider 24 and also the collar 31ª. When the disk 21 of fusible metal, wax or the like, is melted, the molten material runs down into the bottom of the barrel 15 and collects at 21ª, as indicated in Fig. 2. The disk-like valve member 11 is provided with a sharp edge 34, and mounted upon the valve seat 8 is a packing 35 which may be of asbestos. This packing is comparatively soft and is adapted to be engaged by the sharp edge 34 so as to make a gas-tight closure.

The operation of our device is as follows: The movable parts being in their respective normal positions, as indicated in Fig. 1, we will suppose that a fire breaks out and, owing to excessive heat, the fusible disk 21 is melted. The resulting molten material 21ᵃ collects in the bottom of the barrel 15. The destruction of the disk 21 of fusible metal releases the valve stem 14 and the valve drops to its seat. The arms 31 force the levers 28 apart, and as the valve stem moves lower and lower, the pressure of the lower ends of the levers—that is, the pressure of the forks 29—becomes greater and greater against the rails 13. The levers 28 under the influence of the spring 33 assume a vertical position, as in Fig. 2, and thus lock the valve positively in its closed position against the seat. In this way we do not depend on the tension of the spring to hold the valve, as the spring would be weakened by fire. The seating of the valve 11 stops the flow of gas within the piping of the house and tends to prevent such danger as might otherwise be due to a free flow of gas in a burning building in which some of the pipes or gas apparatus may be damaged by the fire. If it is desired to use the valve after being closed as by a fire, the cap 25 may be unscrewed, the stem 14 is raised, and a new disk 21 placed in position.

The packing 35 may be made of sheets of asbestos cemented together by silicate of sodium, and the seat may be coated with any suitable waterproof material. The concave form of the valve seat is designed to prevent the lodgment of any rust particles that may form.

We do not limit ourselves to the precise arrangement shown, as variations may be made therein without departing from the spirit of our invention.

Having thus described our invention, what we claim as new and desire to secure by Letters Patent is:

1. A safety gas valve comprising a casing, a pair of levers disposed within said casing and journaled to swing relatively to each other, a valve stem mounted within said casing, a pair of arms carried by said valve stem and engaging said levers for the purpose of pushing one end of the latter apart when the arms are moved in one direction, a valve member engaged by said levers at the ends thereof which are adapted to be pushed apart, and a valve seat mounted within said casing and adapted to be engaged by said valve member.

2. A device of the character described comprising a casing provided with a cylindrical portion, a member disposed within said cylindrical portion comprising a spider and a pair of arms rigidly connected with said spider, a pair of levers mounted upon said arms, a valve stem, mechanism mounted thereupon and engaging said levers for causing portions thereof to swing apart, a spring on said valve stem exerting pressure on said mechanism, a valve member carried by said stem and slidably engaging said levers and actuated thereby, and a valve seat disposed within the path of travel of said valve member.

3. A device of the character described comprising a casing, a valve seat mounted therein, a valve member located within said casing and movable relatively to said valve seat, said valve member being provided with rails, levers provided with forks engaging said rails, supporting members to which said levers are journaled, a valve stem connected with said valve member and disposed between said levers, a spring on said valve stem, arms carried by said valve stem and slidably engaging said levers, said spring exerting pressure on said arms and means for normally engaging said valve stem and supporting said valve member off of said seat.

4. The combination with the valve and its seat, of fusible means normally sustaining the valve unseated, and a locking member movable to a position approximately perpendicular to the valve when the said fusible means is fused.

5. The combination with the valve and valve seat, of fusible means normally sustaining the valve unseated, a locking member movable to a position approximately perpendicular to the valve when the fusible means fuses, and a spring acting to move the locking member to its locking position.

In testimony whereof we have signed our names to this specification in the presence of two subscribing witnesses.

HOWARD RAYMOND COX.
WILLIAM SCHMIDT.

Witnesses:
   FERDINAND J. SCHMIDT,
   LOUIS W. KATTAU.